J. G. MOOMY.
PROCESS OF MAKING TUBES.
APPLICATION FILED JUNE 1, 1917.
1,275,073.
Patented Aug. 6, 1918.
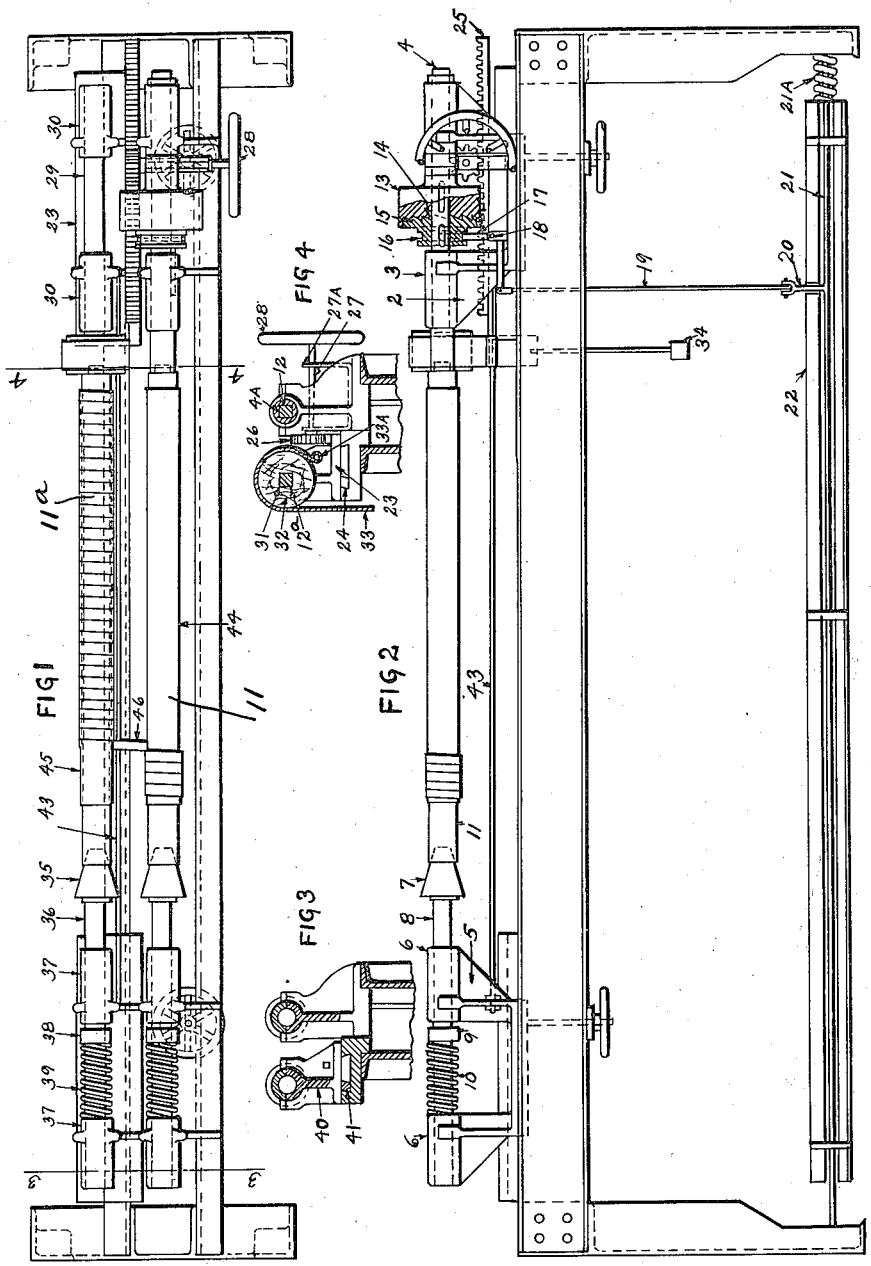
Witness
Inventor
Joseph G. Moomy
By
Attorney

UNITED STATES PATENT OFFICE.

JOSEPH G. MOOMY, OF ERIE, PENNSYLVANIA.

PROCESS OF MAKING TUBES.

1,275,073.  Specification of Letters Patent.  Patented Aug. 6, 1918.

Application filed June 1, 1917. Serial No. 172,323.

*To all whom it may concern:*

Be it known that I, JOSEPH G. MOOMY, a citizen of the United States, residing at Erie, in the county of Erie and State of Pennsylvania, have invented new and useful Improvements in Processes of Making Tubes, of which the following is a specification.

This invention relates to the process of making tubes and consists in certain improvements therein as will be hereinafter fully described and pointed out in the claims.

In the making of tubes such as the inner tubes of pneumatic tires it is common to form a tube of raw stock on the pole and then to wrap a strip of canvas spirally on the tube so formed the canvas holding the material in place during vulcanization. It has been common practice after the vulcanization of a tube to remove the wrapping, rewinding it on some pole or intermediate means and then utilize the canvas again for wrapping a tube. In the present invention this intermediate step is removed and the pull necessary to separate the wrapping from the vulcanized tube is utilized in wrapping a tube of raw stock preparatory to vulcanization.

In carrying out the invention a machine as follows may be used, the machine being illustrated in the accompanying drawings wherein—

Figure 1 shows a plan view of the machine.

Fig. 2 a side elevation of the machine, a part being in section to better show construction.

Fig. 3 a section on the line 3—3 in Fig. 1.

Fig. 4 a section on the line 4—4 in Fig. 1.

1 marks the frame of the machine. A head-block 2 is mounted on the frame. This has a spindle bearing 3 in which is arranged a spindle 4. The spindle 4 has a squared socket 4ª in the end. A tail-piece 5 has the spindle bearing 6. A cone support 7 is carried by the shaft 8, the shaft 8 being journaled in the bearings 6, the bearings being formed with a front and rear part with an open space between. The shaft 8 is provided with a collar 9 arranged between the front and rear portion of the bearing 6 and a spring 10 is mounted on the shaft 8 and rests against the rear portion of the bearing and exerts pressure against the collar 9 to force the cone 7 against a pole 11. The pole 11 has a squared end 12 which is inserted into the socket 4ª so that it is driven with the spindle 4. In placing the pole in the machine, the end is placed against the cone 7, the cone forced back against the pressure of the spring 10 and the squared end 12 slipped into the socket 4ª. The spindle 4 is driven from a pulley 13. This pulley has a friction face 14 which coöperates with a friction member 15. The member 15 is connected with the spindle 4 by a spline and groove mechanism and is provided with a grooved hub 16. A bell crank lever 17 operates in the grooved hub 16. The lever is pivoted at 18 on the frame. A link 19 is also connected with the bell crank lever and extends to an arm 20 secured to a rock shaft 21 extending across the machine near the floor. A long pedal 22 is secured to the rock shaft 21. A spring 21ª on the end of the rock shaft 21 normally holds the clutch out of action. When the pedal 22 is depressed it throws the clutch members into contact and so drives the pole. These parts are of common construction, in wrapping machines.

A sliding head 23 is slidingly mounted in the guide 24 with a dove-tail connection. A rack 25 is mounted on the head 23 and a pinion 26 operates in the rack. The pinion is fixed on a shaft 27 carried by the bearings 27ª and a wheel 28 is fixed on the outer end of the shaft in convenient position to be actuated by the operator. By turning the wheel 28 the head 23 may be moved to the right or left for the purposes hereinafter described. A spindle 29 is journaled in the bearings 30 carried by the head 23. The spindle has a socket 31 in its end adapted to receive the squared end 12ª of the pole 11ª. A friction pulley 32 is fixed on the end of the spindle and a brake band 33 is anchored on the frame at 33ª and extends over this pulley. The end of the band is supplied with a weight 34 so that a certain amount of resistance to rotation is given to the spindle 29. This may be increased or diminished by the increasing or diminishing of the weight 34.

A centering cone 35 is mounted on the spindle 36. The spindle 36 is journaled in the bearings 37. A collar 38 is fixed on the spindle and a spring 39 arranged on the spindle exerting pressure against the collar. The pole 11ª is centered by the cone 35, the cone being pressed back and the squared end may be put into the socket 31. The bearings 37 are carried by the sliding tail-piece 40 and this is mounted in the slide 41 in the frame by a dove-tail connection. A rod 43 connects the head 23 and the head 40 so that the two are moved together when the head 23 is actuated through the action of the pinion 26 on the rack 25.

The operation of the machine is as follows: A pole on which a tube 44 of raw stock is arranged is placed in position between the cone 7 and spindle 4 and is driven by the spindle 4. A pole 11ª with a tube 45 which has been vulcanized is placed between the cone 35 and the spindle 23, the squared end of the pole being placed in the socket 31. The end of the wrapping 46 is pulled loose from the vulcanized tube and started on the pole with the raw tube. The clutch is then thrown into engagement by depressing the pedal 22 and the pole carrying the raw tube is then rotated. This rotation winds the wrapping 46 on to the raw tube pulling it from the vulcanized tube and the winding is repeated with the same overlap and the same spiral on the raw tube as the wrapping had on the vulcanized tube.

In order to start the wrapping on the raw tube in proper position the vulcanized tube is moved to a position opposite the pole carrying the tube of raw stock. This is accomplished by moving the head 23 to the right or left as necessity may require. Where the wrapping breaks it is also necessary to form some overlap and this can be accomplished by moving the head 23 in a direction to give a slight overlap of the wrapping at this point.

The fabric is moistened to facilitate its removal. The wetting of the fabric not only facilitates the separation from the vulcanized tube but also fits the fabric for wrapping on the raw tube so that this wetting accomplishes the double purpose of separation and preparation for winding.

Some tension may be desired from the pulley 32 but by this process there is a local tension which is continuous and very desirable in holding the wrapping in proper relation and tension. Quite a considerable pull is required to release the wrapping from the vulcanized stock and this pull gives a peculiar and desirable tension which is utilized in wrapping the raw tube.

As a result of this process one step in the operation is entirely eliminated, that is to say, the unwinding of the tube accomplishes the wrapping of the raw tube. The elimination of this step reduces the wear and tear on the wrapping and at the same time assures a uniform wrapping under proper tension.

What I claim as new is:—

1. In the making of tubes the wrapping of a raw tube with a wrapping material directly from a tube vulcanized while wrapped in said wrapping material.

2. In the making of tubes the moistening of the wrapping material on a vulcanized tube vulcanized while wrapped in the wrapping material, unwinding said wrapping material so moistened from the vulcanized tube and winding it directly on a tube of raw stock as it is unwound from the vulcanized tube.

3. In the making of tubes the wrapping of a tube of raw stock spirally with a strip of wrapping material directly from a tube vulcanized while wrapped in said strip of wrapping material wound spirally thereon.

4. In the making of tubes the wrapping of a tube of raw stock spirally with a strip of wrapping material directly from a tube vulcanized while wrapped in said strip of wrapping material wound spirally thereon, the wrapping progressing on the raw tube as the unwinding progresses on the vulcanized tube.

5. In the making of tubes the wrapping of a tube of raw stock with a wrapping material directly from a tube vulcanized while wrapped in said wrapping material and allowing the pull incident to the separation of the wrapping material to act as tension in the winding of the raw tube.

6. In the making of tubes the placing of a vulcanized tube with its wrapping in spiral form in parallel relation with and opposite to a raw tube to be wrapped, carrying the wrapping from the vulcanized tube to the raw tube, and winding the raw tube by rotation as the vulcanized tube is unwound while allowing the pull of the separating of the wrapping from the vulcanized tube to act in tensioning the wrapping on the raw tube.

7. In the making of rubber tubes the placing of a vulcanized tube with its wrapping moistened in parallel with and opposite a raw tube to be wrapped, carrying the wrapping from the vulcanized tube to the raw tube, and winding the raw tube by rotation as the vulcanized tube is unwound while allowing the pull of the separating of the wrapping from the vulcanized tube to act in tensioning the wrapping on the raw tube.

In testimony whereof I have hereunto set my hand.

JOSEPH G. MOOMY.